(12) United States Patent
Lu et al.

(10) Patent No.: US 11,726,395 B2
(45) Date of Patent: Aug. 15, 2023

(54) PROJECTION APPARATUS

(71) Applicant: IVIEW DISPLAYS (SHENZHEN) COMPANY LTD., Shenzhen (CN)

(72) Inventors: Guoming Lu, Shenzhen (CN); Wenxiang Li, Shenzhen (CN); Mingnei Ding, Shenzhen (CN); Steve Yeung, Hong Kong (CN); Zhiqiang Gao, Hong Kong (CN)

(73) Assignee: IVIEW DISPLAYS (SHENZHEN) COMPANY LT, Shenzhen (CN)

( * ) Notice: Subject to any disclaimer, the term of this patent is extended or adjusted under 35 U.S.C. 154(b) by 42 days.

(21) Appl. No.: 17/539,300

(22) Filed: Dec. 1, 2021

(65) Prior Publication Data

US 2022/0091490 A1  Mar. 24, 2022

Related U.S. Application Data

(63) Continuation of application No. PCT/CN2020/125339, filed on Oct. 30, 2020.

(30) Foreign Application Priority Data

Apr. 10, 2020 (CN) .......................... 202020528559.2

(51) Int. Cl.
*G03B 21/14* (2006.01)
*G03B 21/54* (2006.01)
*F16M 11/08* (2006.01)
*G03B 21/30* (2006.01)

(52) U.S. Cl.
CPC .......... *G03B 21/145* (2013.01); *F16M 11/08* (2013.01); *G03B 21/30* (2013.01); *G03B 21/54* (2013.01)

(58) Field of Classification Search
CPC ...... G03B 21/145; G03B 21/54; G03B 21/14; G03B 21/30; F16M 11/08; F16M 11/18; F16M 11/2014; F16M 11/10
See application file for complete search history.

(56) References Cited

U.S. PATENT DOCUMENTS

| 2015/0022785 | A1* | 1/2015 | Kinebuchi | ............... H04N 9/31 353/119 |
| 2016/0291448 | A1 | 10/2016 | Kinebuchi et al. | |
| 2017/0130945 | A1* | 5/2017 | Kitano | ..................... H04B 1/38 |

(Continued)

FOREIGN PATENT DOCUMENTS

| CN | 107387966 A | * 11/2017 | ........... G03B 21/145 |
| CN | 207777899 U | 8/2018 | |

(Continued)

*Primary Examiner* — Magda Cruz
(74) *Attorney, Agent, or Firm* — IPro, PLLC; Na Xu

(57) ABSTRACT

The present disclosure provides a projection apparatus. The projection apparatus includes: a projection body, a rotation platform, wherein the projection body is rotatably connected to the rotation platform; a first drive device, arranged on the projection apparatus and configured to drive the projection body to rotate relative to the rotation platform; a base, wherein the rotation platform is rotatably connected to the base; a second drive device, arranged on the base and configured to drive the rotation platform to rotate relative to the base; and a controller, arranged on the projection apparatus and configured to control the first drive device and the second drive device.

17 Claims, 2 Drawing Sheets

(56) References Cited

U.S. PATENT DOCUMENTS

2020/0393745 A1\* 12/2020 Shie .................... G03B 21/145
2021/0247682 A1\* 8/2021 Shimizu ............... H04N 9/3155
2021/0286250 A1\* 9/2021 Abe ...................... H04N 9/317

FOREIGN PATENT DOCUMENTS

| CN | 209044281 U | \* | 6/2019 | ............ G03B 21/14 |
|----|-------------|---|--------|------------------------|
| CN | 210106954 U |   | 2/2020 |                        |
| CN | 210179263 U |   | 3/2020 |                        |
| CN | 210270382 U |   | 4/2020 |                        |
| KR | 20120019289 A | \* | 3/2012 | ............ G03B 21/14 |
| KR | 20120019289 A |   | 3/2012 |                        |
| KR | 20180068218 A | \* | 6/2018 | ............... G06F 3/01 |
| KR | 20180068218 A | \* | 6/2018 | ............... G06F 3/01 |

\* cited by examiner

PROJECTION APPARATUS

CROSS-REFERENCE TO RELATED APPLICATIONS

This application is a continuation-application of International (PCT) Patent Application No. PCT/CN2020/125339, filed on Oct. 30, 2020, which claims priority to Chinese Patent Application No. 202020528559.2, filed with the National Intellectual Property Administration of China on Apr. 10, 2020, and entitled "PROJECTION APPARATUS", the entire contents of which are incorporated herein by reference.

TECHNICAL FIELD

Embodiments of the present disclosure relate to the technical field of projection, and in particular, relate to a projection apparatus.

BACKGROUND

A projection apparatus is an optical instrument which magnifies, by using an optical element, an object to be projected, such as an image or a video, and projects the magnified object to be projected onto a screen. Some projection apparatuses may be connected to a computer, a VCD (Video Compact Disc), a DVD (Digital Video Disc), a BD (Blu-ray Disc), a game machine, a DV (Digital Video), and the like via different interfaces to play corresponding video signals. Some other projection apparatuses may be connected to a WiPlug, then a computer, a mobile phone, or a pad is connected to the WiPlug within a same Wi-Fi network, and finally content of the computer, the mobile phone or the pad may be synchronously displayed onto the screens of the projection apparatuses. Therefore, the projection apparatuses are widely used in scenarios of homes, offices, schools, recreation places, and the like. However, during practice of the present disclosure, the present inventors have found that at present, the projection apparatuses in the market are mostly unitary, and fail to have a bidirectional multi-azimuth automatic projection function. In this case, the projection apparatus needs to be manually adjusted or moved in order to achieve bidirectional projection, and thus user experience is poor.

SUMMARY

An embodiment of the present disclosure provides a projection apparatus. The projection apparatus includes: a projection body configured to project projection content; rotation platform, wherein the projection body is arranged on the rotation platform, and the projection body is rotatably connected to the rotation platform; a first drive device, arranged on the projection apparatus and configured to drive the projection body to rotate relative to the rotation platform; a base, wherein the rotation platform is rotatably connected to the base; a second drive device, arranged on the base and configured to drive the rotation platform to rotate relative to the base; and a controller, arranged on the projection apparatus and configured to control the first drive device and the second drive device.

Another embodiment of the present disclosure provides a projection apparatus. The projection apparatus includes: a projection body, configured to project projection content; a rotation platform, wherein the projection body is rotatably connected to the rotation platform; a first drive device, arranged on the projection apparatus and configured to drive the projection body to rotate relative to the rotation platform; a base, wherein the rotation platform is rotatably connected to the base; and a second drive device, arranged on the base and configured to drive the rotation platform to rotate relative to the base.

BRIEF DESCRIPTION OF THE DRAWINGS

One or more embodiments are illustrated by way of example, and not by limitation, in the accompanying drawings, wherein components having the same reference numeral designations represent like components throughout. The drawings are not to scale, unless otherwise disclosed.

DETAILED DESCRIPTION

For clearer descriptions of the objects, technical solutions, and advantages of the embodiments of the present disclosure, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. It should be understood that the specific embodiments described herein are only intended to explain the present disclosure instead of limiting the present disclosure. Based on the embodiments of the present disclosure, all other embodiments derived by persons of ordinary skill in the art without any creative efforts shall fall within the protection scope of the present disclosure.

It should be noted that, when an element is defined as "being secured or fixed to" another element, the element may be directly positioned on the element or one or more centered elements may be present therebetween. When an element is defined as "being connected or coupled to" another element, the element may be directly connected or coupled to the element or one or more centered elements may be present therebetween. As used herein, the terms "vertical", "horizontal", "left", "right", and similar expressions are for illustration purposes.

In addition, technical features involved in various embodiments of the present disclosure described hereinafter may be combined as long as these technical features are not in conflict.

Figure 1:
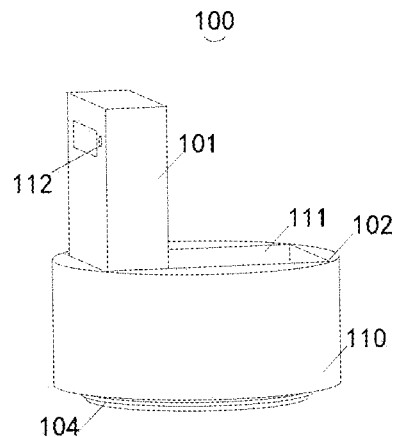
FIG. 1 is a schematic diagram of a projection apparatus according to an embodiment of the present disclosure.
Figure 2:
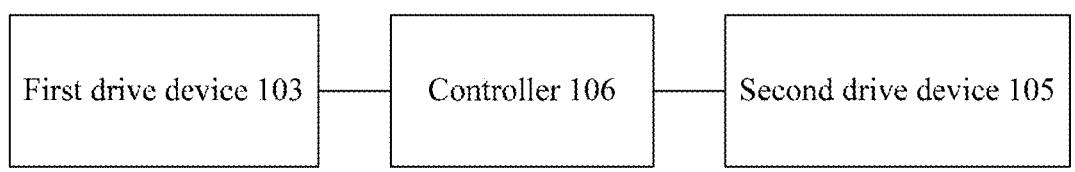
FIG. 2 is a schematic diagram of connection between modules of the projection apparatus according to an embodiment of the present disclosure.

Referring to FIG. 1 and FIG. 2, a projection apparatus 100 includes a projection body 101, a rotation platform 102, a first drive device 103, a base 104, a second drive device 105, and a controller 106. The projection body 101 is configured to project projection content. One end of the projection body 101 is rotatably connected to the rotation platform 102. A surface of the rotation platform 102 is superimposed on the base 104, and the rotation platform 102 is rotatably connected to the base 104. The first drive device 103 is arranged on the projection apparatus 100, e.g., arranged on the rotation platform 102. The second drive device 105 is arranged on the base 104. The controller 106 is arranged on the projection apparatus 100. The first drive device 103 and the second drive device 105 are both communicably connected to the controller 106. In the case that the controller 106 controls the first drive device 103 to be turned on, the first drive device 103 drives the projection body 101 to rotate by 0 to 90 degrees in a vertical direction. In the case that the controller 106 controls the second drive device 105 to be turned on, the second drive device 105 drives the rotation platform 102 to rotate to drive the projection body 101 to rotate by 0 to 360 degrees in a horizontal direction. In this way, the projection apparatus 100 achieves bidirectional multi-azimuth automatic projection.

Figure 3:
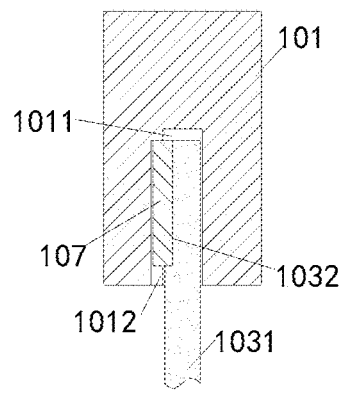
FIG. 3 is a transverse sectional diagram of a projection body according to an embodiment of the present disclosure.

With respect to the first drive device 103, the first drive device 103 is configured to drive the projection body 101 to rotate by 0 to 90 degrees in a vertical direction relative to the rotation platform 102. Referring to FIG. 3, in some embodiments, the projection apparatus 100 further includes a connection key 107. An output end of the first drive device 103 is provided with a first connection shaft 1031, and a side surface of the projection body 101 is provided with a first connection recess 1011, wherein the first connection shaft 1031 is inserted into the first connection recess 1011. A side surface of the first connection recess 1011 is provided with a first key slot 1012, and a side surface of the first connection shaft 1031 is provided with a second key slot 1032, wherein one end of the connection key 107 is fixed into the second key slot 1032, and the other end of the connection key 107 is inserted into the first key slot 1012. In the case that the first drive device 103 is turned on, the first drive device 103 drives the first connection shaft 1031 to rotate, and thus drives, by the connection key 107 fixed on the first connection shaft 1031, the projection body 101 to rotate.

It may be understood that besides the above fashion, the first drive device 103 drives, in any other suitable fashions, the projection body 101 to rotate by 0 to 90 degrees in a vertical direction relative to the rotation platform. For example, an output end of the first drive device 103 is provided with a first connection shaft 1031, and a side surface of the projection body 101 is provided with a first connection recess 1011. The first connection shaft 1031 is received in the first connection recess 1011. A side surface of an end at which the first connection shaft 1031 is received in the first connection recess 1011 is machined with a first thread (not illustrated in the drawings). A side surface of the first connection recess 1011 is machined with a second thread (not illustrated in the drawings). The first connection shaft 1031 is connected to the first connection recess 1011 by the first thread and the second thread.

Figure 4:
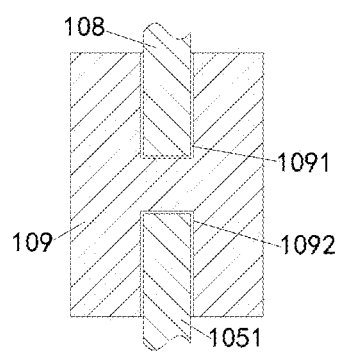
FIG. 4 is a schematic partial sectional diagram of the projection apparatus according to an embodiment of the present disclosure.

With respect to the second drive device 105, the second drive device 105 is configured to drive the rotation platform 102 to rotate relative to the base 104 to drive the projection body 101 to rotate by 0 to 360 degrees in a horizontal direction. Referring to FIG. 4, in some embodiments, an output end of the second drive device 105 is provided with a second connection shaft 1051. A surface of the rotation platform 102 extends towards the base 104 to form a connection portion 108. The projection apparatus 100 further includes a connection post 109, wherein one end of the connection post 109 is provided with a first connection recess 1091, and the other end of the connection post 109 is provided with a second connection recess 1092, wherein the connection portion 108 is inserted into the first connection recess 1091, and the second connection shaft 1051 is inserted into the second connection recess 1092. In the case that the second drive device 105 is turned on, the second drive device 105 drives the second connection shaft 1051 to rotate, and thus the second connection shaft 1051 drives the connection post 109 to rotate. The rotation post 109 drives the connection portion 108 to rotate, and thus the connection portion 108 drives the rotation platform 102 to rotate to drive the projection body 101 to rotate.

In some embodiments, a cross section of an end at which the second connection shaft 1051 is inserted into the second connection recess 1092, a cross section of the connection portion 108, and cross sections of the first connection recess 1091 and the second connection recess 1092 are all equilateral hexagonal to transfer an even greater torque, such that smooth rotation of the rotation platform 102 is ensured.

It may be understood that besides the above fashion, the second drive device 105 is configured to drive, in any other suitable fashions, the rotation platform 102 to rotate relative to the base 104 to drive the projection body 101 to rotate by 0 to 360 degrees in a horizontal direction. The suitable fashions are not exhaustively described herein.

With respect to the controller 106, the controller 106 is communicably connected to the first drive device 103 and the second drive device 105, and configured to control turn-on or turn-off of the first drive device 103 and the second drive device 105. In some embodiments, in response to an instruction issued by voice, gesture, touch, or the like or an instruction issued by a remote control (not illustrated in the drawings), the controller 106 is capable of controlling the first drive device 103 to be turned on or turned off, controlling the second drive device 105 to be turned on or turned off, and simultaneously controlling the first drive device 103 and the second drive device 105 to be turned on or turned off.

It should be noted that the controller receives the instruction and controls turn-on or turn-off of the first drive device 103 and the second drive device 105 by conventional program steps. The controller may also be a conventional processor, for example, an Intel I3 processor, an AMD Ryzen processor, or the like.

In some embodiments, a side surface of the rotation platform 102 is further surrounded by a primary housing 110. The primary housing 110 is configured to wrap the connection post 108 and partially wrap the base 104, such that the projection apparatus 100 has a good appearance and achieves a dust-proofing effect.

In some embodiments, the projection apparatus 100 further includes a groove 111. The groove 111 is arranged on a surface, facing away from the base 104, of the rotation platform 102. One end of the projection body 101 is arranged in the groove 111, and the groove 111 is configured to receive the projection body 101 in response to the projection body 101 rotating to be horizontal with the rotation platform 102. The groove 111 is further configured to confine, in response to the projection body 101 rotates in a vertical direction, the projection body 101 to rotate within 0 to 90 degrees.

In some embodiments, the first drive device 103 is a first motor (not illustrated in the drawings).

In some embodiments, the second drive device 105 is a second motor (not illustrated in the drawings).

In some embodiments, the projection apparatus 100 further includes a camera 112. The camera 112 is arranged on the projection body 101 and configured to capture images of a person and a projection picture, and improve user experience.

In the above embodiments of the present disclosure, the projection apparatus 100 includes the projection body 101, the rotation platform 102, the first drive device 103, the base 104, the second drive device 105, and the controller 106.

One end of the projection body 101 is rotatably connected to the rotation platform 102. A surface of the rotation platform 102 is superimposed on the base 104, and the rotation platform 102 is rotatably connected to the base 104. In the case that the controller 106 controls the first drive device 103 to be turned on, the first drive device 103 drives the projection body 101 to rotate by 0 to 90 degrees in a vertical direction. In the case that the controller 106 controls the second drive device 105 to be turned on, the second drive device 105 drives the rotation platform 102 to rotate to drive the projection body 101 to rotate by 0 to 360 degrees in a horizontal direction. In this way, the projection apparatus 100 achieves bidirectional multi-azimuth automatic projection, and thus user experience is improved.

It should be noted that the specification and drawings of the present disclosure illustrate preferred embodiments of the present disclosure. However, the present disclosure may be implemented in different manners, and is not limited to the embodiments described in the specification. The embodiments described are not intended to limit the present disclosure, but are directed to rendering a thorough and comprehensive understanding of the disclosure of the present disclosure. In addition, the above described technical features may incorporate and combine with each other to derive various embodiments not illustrated in the above specification, and such derived embodiments shall all be deemed as falling within the scope of the specification of the present disclosure. Further, a person skilled in the art may make improvements or variations according to the above description, and such improvements or variations shall all fall within the protection scope as defined by the claims of the present disclosure.

The invention claimed is:

1. A projection apparatus, comprising:
    a projection body, configured to project projection content;
    a rotation platform, wherein the projection body is arranged on the rotation platform, and the projection body is rotatably connected to the rotation platform;
    a first drive device, arranged on the projection apparatus and configured to drive the projection body to rotate relative to the rotation platform;
    a base, wherein the rotation platform is rotatably connected to the base, a surface of the rotation platform towards the base is provided with a connection portion;
    a second drive device, arranged on the base and configured to drive the rotation platform to rotate relative to the base, an output end of the second drive device is provided with a second connection shaft;
    a controller, arranged on the projection apparatus and configured to control the first drive device and the second drive device; and
    a connection post, wherein one end of the connection post is provided with a first connection recess, and the other end of the connection post is provided with a second connection recess, wherein the connection portion is inserted into the first connection recess, and the second connection shaft is inserted into the second connection recess.

2. The projection apparatus according to claim 1, further comprising a connection key; wherein
    an output end of the first drive device is provided with a first connection shaft, and a side surface of the projection body is provided with a first connection recess, wherein the first connection shaft is inserted into the first connection recess;
    wherein a side surface of the first connection recess is provided with a first key slot, and a side surface of the connection shaft is provided with a second key slot, wherein one end of the connection key is fixed into the second key slot, and the other end of the connection key is inserted into the first key slot.

3. The projection apparatus according to claim 1, wherein a side surface of the rotation platform is surrounded by a primary housing, wherein the primary housing is configured to wrap the connection post and partially wrap the base.

4. The projection apparatus according to claim 1, further comprising a groove;
    wherein the groove is arranged on another surface of the rotating platform, one end of the projection body is arranged in the groove, and the groove is configured to receive the projection body in response to the projection body rotating to be horizontal with the rotation platform.

5. The projection apparatus according to claim 1, wherein the first drive device is a first motor.

6. The projection apparatus according to claim 1, wherein the second drive device is a second motor.

7. The projection apparatus according to claim 1, further comprising a camera arranged on the projection body.

8. The projection apparatus according to claim 1, wherein one end of the projection body is rotatably connected to the rotation platform.

9. The projection apparatus according to claim 1, wherein the first drive device is arranged on the rotation platform.

10. The projection apparatus according to claim 1, wherein a surface of the rotation platform is superimposed on the base.

11. A projection apparatus, comprising:
    a projection body, configured to project projection content;
    a rotation platform, wherein the projection body is rotatably connected to the rotation platform;
    a first drive device, arranged on the projection apparatus and configured to drive the projection body to rotate relative to the rotation platform;
    a base, wherein the rotation platform is rotatably connected to the base, a surface of the rotation platform towards the base is provided with a connection portion;
    a second drive device, arranged on the base and configured to drive the rotation platform to rotate relative to the base, an output end of the second drive device is provided with a second connection shaft; and
    a connection post, wherein one end of the connection post is provided with a first connection recess, and the other end of the connection post is provided with a second connection recess, wherein the connection portion is inserted into the first connection recess, and the second connection shaft is inserted into the second connection recess.

12. The projection apparatus according to claim 11, further comprising a controller arranged on the projection apparatus and configured to control turn-on or turn-off of the first drive device and the second drive device.

13. The projection apparatus according to claim 11, further comprising a connection key; wherein
    an output end of the first drive device is provided with a first connection shaft, and a side surface of the projection body is provided with a first connection recess, wherein the first connection shaft is inserted into the first connection recess;
    wherein a side surface of the first connection recess is provided with a first key slot, and a side surface of the connection shaft is provided with a second key slot, wherein a first portion of the connection key is fixed into the second key slot, and a second portion of the connection key is inserted into the first key slot.

14. The projection apparatus according to claim 11, wherein a side surface of the rotation platform is surrounded by a primary housing, wherein the primary housing is configured to partially wrap the base.

15. The projection apparatus according to claim 11, further comprising a groove;
   wherein the groove is arranged on another surface of the rotating platform, one end of the projection body is arranged in the groove, and the groove is configured to receive the projection body in response to the projection body rotating to be horizontal with the rotation platform.

16. The projection apparatus according to claim 11, wherein the first drive device is a first motor, and the second drive device is a second motor; or
   wherein the projection apparatus further comprises a camera arranged on the projection body.

17. The projection apparatus according to claim 11, wherein one end of the projection body is rotatably connected to the rotation platform, the first drive device is arranged on the rotation platform, and a surface of the rotation platform is superimposed on the base.

\* \* \* \* \*